United States Patent [19]

Plauborg et al.

[11] Patent Number: 5,678,604
[45] Date of Patent: Oct. 21, 1997

[54] FAST OPENING, SLOW CLOSING, RELIEF VALVE

[75] Inventors: Erik Plauborg, Sønderborg; Erik Haugaard, Gråsten, both of Denmark

[73] Assignee: Danfoss A/S, Nordborg, Denmark

[21] Appl. No.: 346,700

[22] Filed: Nov. 30, 1994

[30] Foreign Application Priority Data

Dec. 8, 1993 [DK] Denmark ................ 1371/93

[51] Int. Cl.[6] .................................. F16K 21/10
[52] U.S. Cl. .................... 137/514.7; 137/542; 137/536
[58] Field of Search ................... 137/514.7, 542, 137/536

[56] References Cited

U.S. PATENT DOCUMENTS

| | | | |
|---|---|---|---|
| 1,003,412 | 9/1911 | Ballard | 137/514.7 |
| 2,568,026 | 9/1951 | Pigott | 137/514.7 X |
| 2,667,893 | 2/1954 | Kupiec | 137/514.7 X |
| 2,917,077 | 12/1959 | Ziege | 137/514.7 |
| 4,270,569 | 6/1981 | Reay | 137/514.7 |
| 4,603,710 | 8/1986 | Tiefenthaler | 137/514.7 |
| 5,232,013 | 8/1993 | Morris | 137/514.7 |

*Primary Examiner*—John Rivell
*Attorney, Agent, or Firm*—Lee, Mann, Smith, McWilliams, Sweeney & Ohlson

[57] ABSTRACT

A valve is indicated as well as a device for controlling the valve body in a valve, which is special in that the travel of the valve body in the valve housing is insignificantly damped in the opening movement of the valve, and strongly damped in the closing movement of the valve. The valve is therefore distinguished by the fact that especially in connection with pressure media with a low boiling point, the risk of cavitation in the valve and instability in operation is reduced.

6 Claims, 1 Drawing Sheet

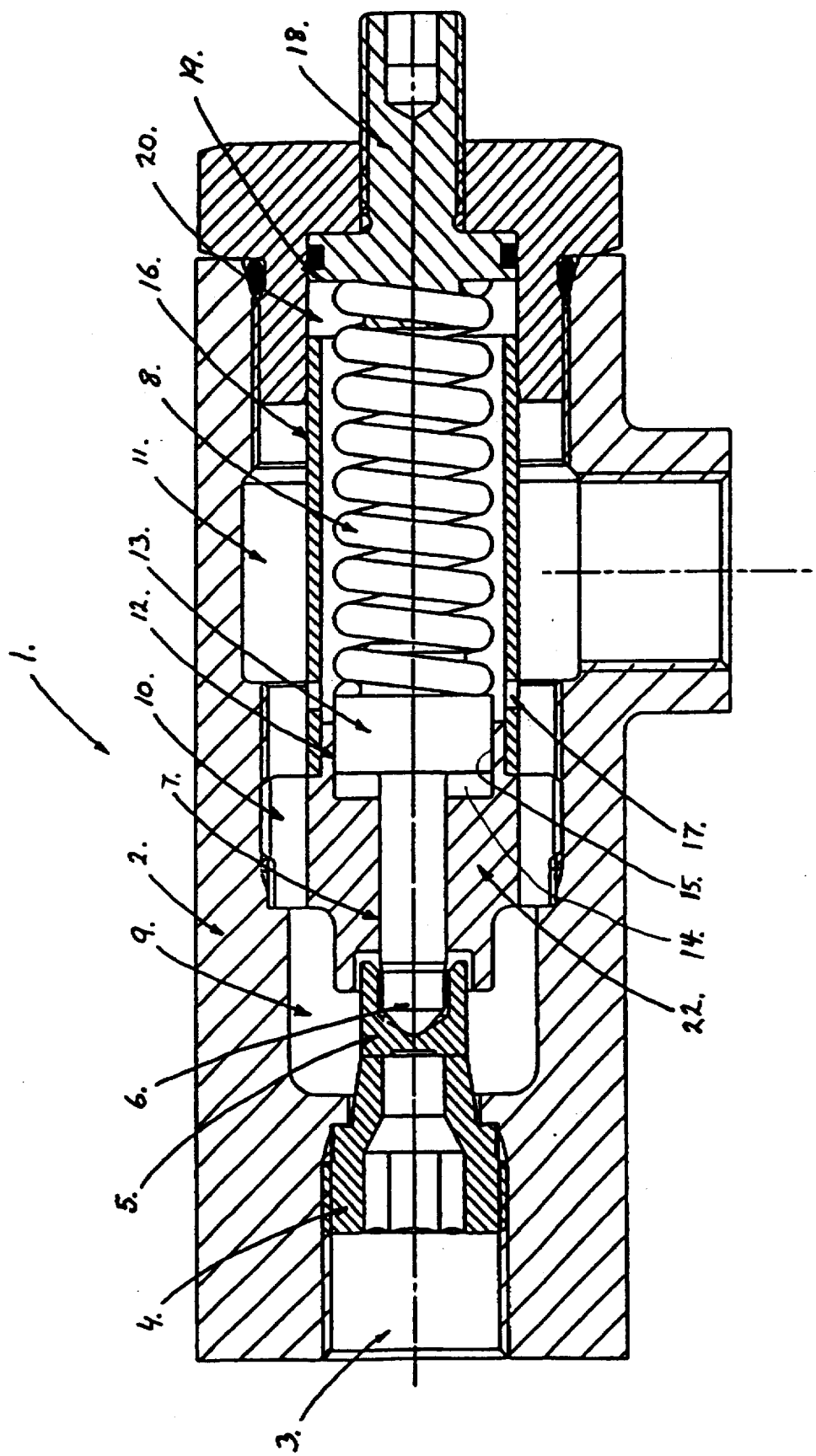

FAST OPENING, SLOW CLOSING, RELIEF VALVE

The present invention relates to valves of the type used for example in connection with hydraulic plant, where they are used among other things as overflow valves or safety valves, which open automatically when the hydraulic pressure in the plant exceeds a predetermined level, in that the valve has a pressure inlet and a pressure outlet, and where in the pressure inlet there is a valve seat, on which rests a movable valve body acted upon by an elastic body.

Such valves are known i.a. from U.S. Pat. No. 3,952,771, where the valve body is acted upon in a direction away from a valve seat as a consequence of the medium pressure on the pressure inlet of the valve, and where an elastic body acts on the valve body in the direction of the valve seat. The opening and closing movements of the valve body are damped, because behind the valve body there is a fluid-filled volume, which when the valve is closed is in connection with the pressure side of the valve via a servo valve, and thereby supplied with fluid, and when the valve body is moved in the opening direction, the servo valve is designed to connect the fluid-filled volume with the outlet side of the valve.

Since according to U.S. Pat. No. 3,952,771 the valves act on the valve body with a relatively high damping of the opening movement of the valve and a small damping of the closing movement of the valve, these valves have the disadvantage that cavitation may occur at large pressure drops and high flow rate through the valve, if the pressure medium has a low boiling point. These valves are therefore unsuitable in plants using pressure media with low boiling point, such as plants where the pressure medium is water-based.

The task forming the basis of the present invention is therefore to reduce the risk of cavitation and instability when using valves of the type indicated in the introduction in plant using pressure media with low boiling point, as for example water-based pressure media.

This is achieved by using the valve and the arrangement according to the invention.

In this manner it is achieved that the valve body is moderately damped in its movement away from the valve seat and relatively strongly damped in its movement towards the valve seat, to the effect that as a consequence of a pressure rise at the pressure inlet of the valve, the valve body opens quickly with relatively low damping, and that the distance between the valve seat and the valve body is quickly increased at increased flow, without any substantial change of the flow over the valve seat, and so that the flow remains almost laminar, thus avoiding cavitation.

In addition it is ensured that instability is reduced, because the valve body is relatively strongly damped in its movement towards the valve seat, so that eigenfrequency phenomena in the valve body movement are avoided.

It is possible to achieve damping in many ways, but by the means of the invention a hydraulic damping is achieved, which is very simple in its design, and which is distinguished by long life. The hydraulic damping effects a vacuum in the damping volume as a consequence of the movement of the valve body away from the valve seat, and a steam pocket may develop in the damping volume, which causes low damping. At the same time fluid from the pressure outlet from the valve via the opening will gradually flow into the damping volume. If the valve body is then moved in the opposite direction, because the flow is reduced, the fluid is pressed out through the opening to the pressure outlet of the valve, causing a relatively high damping.

The invention makes it possible to adjust the pretensioning of the spring, and thereby the pressure required to activate the valve.

By surrounding the spring with a tube, it is ensured that the spring is not acted directly upon by the fluid flow, which can cause an unwanted, unstable spring pressure.

By placing openings in the tube, it is achieved that the venting of the valve occurs automatically during operation.

In one embodiment, the cylinder body works as a throttle valve in the flow path between the pressure inlet and the pressure outlet of the valve, so that a pressure drop is created at the cylinder body, which further reduces the risk of cavitation at the valve seat.

A uniform flow is achieved in the valve seat chamber, so that the valve body is acted uniformly upon on the whole circumference by the flow forces.

The orifice between the damping volume and the pressure outlet of the valve consists of a slot between the piston and the cylinder body, whereby a particularly simple construction is achieved, which is cheap to produce.

BRIEF DESCRIPTION OF THE DRAWING

An embodiment of the invention is described in detail in the following with reference to the drawing, which shows a section of a valve with an arrangement according to the invention.

DESCRIPTION OF THE PREFERRED EMBODIMENT

The drawing shows an overflow valve 1 with a valve housing 2 with a pressure inlet 3 for connection to a hydraulic plant. The pressure inlet is provided with a valve seat 4, which by means of a thread is screwed into the pressure inlet 3 of the valve 1, so that the valve seat 4 can be replaced when required, so that for example in the same valve 1 several valve seats with different dimensions can be placed, whereby valves can be achieved with different characteristics by using one and the same valve housing 2. The thread can also be used for connecting the valve 1 to a hydraulic plant.

At the valve seat 4 a valve body 5 is arranged, connected pivotally on a rod 6, so that the valve body 5 always bears firmly against the valve seat 4. The rod is slidingly mounted in a guide 7 in a cylinder body 22, which is fixed in relation to the valve housing 2, so that the valve body 5 together with the rod 6 can be slid to and from the valve seat 4. At the end turning away from the valve body, the rod 6 is acted upon by a coil spring 8, which thereby presses the valve body 5 to bear closely against the valve seat 4. In the valve housing, from the valve seat 4, are arranged a valve seat chamber 9 and a channel 10 to the pressure outlet 11 of the valve 1.

Thus the valve 1 works in such a manner, that as a consequence of a hydraulic pressure on the pressure inlet 3, the valve body moves away from the valve seat 4, so that the valve opens. Thereby fluid will flow from the pressure inlet 3 via valve seat chamber 9 and channel 10, and out of the valve 1 at its pressure outlet 11.

According to the present invention the movement of the valve body 5 is damped, however, so that the damping of the movement of the valve body away from the valve seat 4 is less than of the movement towards the valve seat 4, because the guide 7 at the end turning away from the valve element 5 is designed with a cylinder bore 12 in the cylinder body 22, in which a piston 13 is placed, which is held by the rod 6. The piston 13 thereby moves synchronously in the axial direction with the rod 6 and the valve body 5, and a damping volume 14 is created between the piston 13 and the cylinder bore 12. Between the piston 13 and the cylinder bore a spacing is created, which ensures a flow connection between the damping volume 14 and the pressure outlet.

Thereby this damping volume 14 will be increased when the valve body 5 is moved away from the valve seat 4 and conversely. The spacing 15 is dimensioned in such a manner that in the damping volume 14, when the valve body is moved away from the valve seat, a gas pocket is created in the damping volume 14, and the damping of this movement is quite small. If the valve body 5 subsequently moves in the direction of the valve seat, the fluid in the damping volume 14 will be compressed and escape through the spacing, whereby a relatively high damping of the movement is achieved.

Thereby the risk is reduced of cavitation in the pressure medium during opening of the valve 1, because the valve 1 will open relatively quickly, while at the same time the relatively high damping of the movement of the valve body 5 towards the valve seat 4 results in a reduction of the risk of instability in the movement of the valve body 5 while the valve is open.

The valve 1 can be arranged in such a manner, that the valve seat chamber 9 has a relatively large cross section at the valve seat, and the following channel 10 has a reduced cross section, so that a considerable pressure drop is achieved across the following channel 10, whereby the risk of cavitation at the valve seat 4 is further reduced.

In addition, the coil spring 8 can be shielded from the pressure outlet 11 of the valve 1 in that the spring 8, as shown in the drawing, is arranged in a tube 16, enclosed by the housing 2 adjacent the outlet 11, which is provided with openings 17. This shielding will further reduce the risk of instability, because the contact pressure of the spring 8 is little influenced by the fluid flow.

As shown in the drawing, the contact pressure of the valve body 5 on the valve seat 4 can be adjusted by means of the screw 18. This screw is connected via a contact surface 19 to the coil spring 8, so that the contact surface 19 can be moved. Between the tube 16 and the contact surface 19 a clearance 20 is arranged, which forms a stop for the contact surface 19, so that this cannot be moved so much that the valve blocks.

It is obvious that on the basis of the above description a specialist will be able to indicate alternative embodiments of such valves, which are based on the basic principle of the invention. For example, the guide 7, 12 may be an integrated part of the valve housing 2, or, as shown in the drawing, it may be detachable from the valve housing, which applies also to others of the components shown in the valve housing. This makes it possible, for example, to convert existing valve housings by installing a control device according to the present invention.

We claim:

1. In a device for controlling the movement of a valve body in a valve, the device comprising a valve housing having a pressure inlet and a pressure outlet, and a valve seat disposed in the pressure inlet, and including an elastic element acting on the valve body in a direction toward the valve seat for closing the valve, the improvement comprising a damper arranged such that movement of the valve body towards the valve seat is damped more than the movement away from the valve seat, the damper comprising a defined damping volume with at least one movable pressure surface which is connected to the valve body, the damper being arranged such that the damping volume is increased when the valve body is moved away from the valve seat, and in which the damping volume communicates with the pressure outlet via a spacing, the damping volume comprising a cylinder element with a closed bottom, said cylinder element being fixed in relation to the valve housing, and having a movable piston located in said cylinder element, said piston being connected to the valve body via a rod extending through a guide in said closed bottom of the cylinder element, the elastic element being a coiled pressure spring having one end in contact with a side of the piston opposite from the damping volume, and having an opposite end in contact with a contact surface which is fixed in relation to the valve housing, said spring being enclosed in a tube having an interior volume connected with the pressure outlet of the valve through at least one opening in said tube, said tube enclosed by said housing adjacent said outlet.

2. A device according to claim 1, including a screw element mounted in a bore in the valve housing, the contact surface forming part of the screw element and the screw element being adjustably movable in the valve housing for adjusting pre-tensioning of the spring.

3. A device according to claim 1 in which the opening is aligned with a transition between the piston and the spring.

4. A device according to claim 1, in which the cylinder element is located in a flow path between a valve seat chamber and the pressure outlet of the valve.

5. A device according to claim 1, in which the cylinder element includes a number of channels which are located symmetrically at a circumference of the cylinder element.

6. A device according to claim 1, in which said spacing to the damping volume is between the piston and the cylinder body.

* * * * *